F. TOWNSEND.
PIPE COUPLING.
APPLICATION FILED NOV. 4, 1915.
1,186,621.
Patented June 13, 1916.
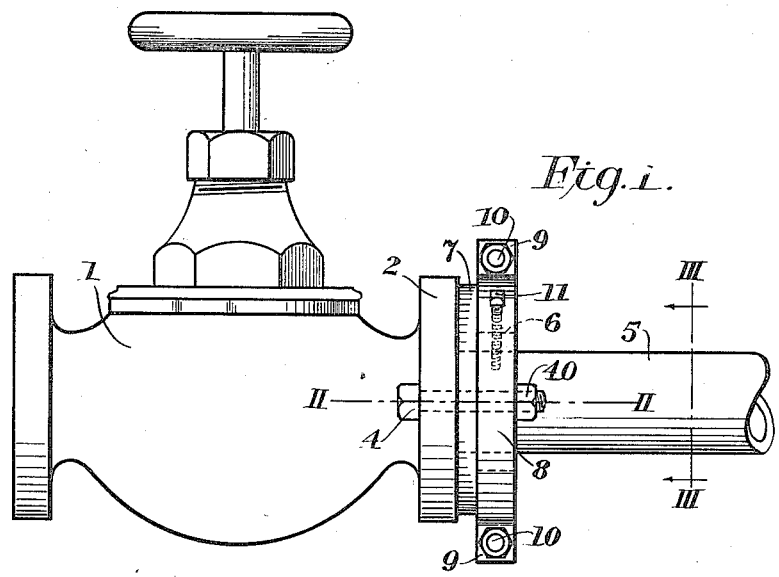
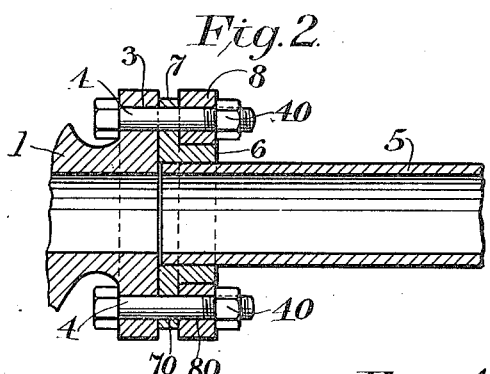
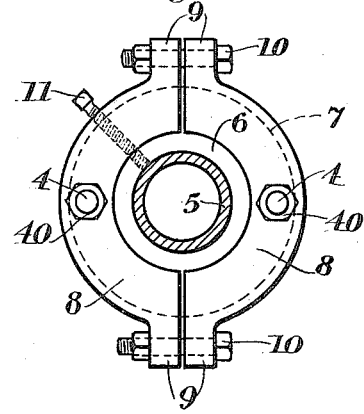
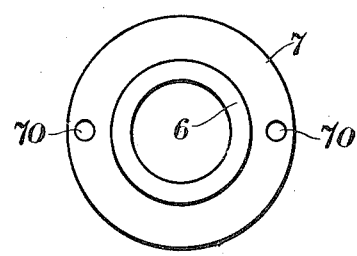
Inventor
Frank Townsend
By Frederick V. Winters
Attorney

UNITED STATES PATENT OFFICE.

FRANK TOWNSEND, OF NEW YORK, N. Y.

PIPE-COUPLING.

1,186,621.

Specification of Letters Patent.

Patented June 13, 1916.

Application filed November 4, 1915. Serial No. 59,571.

*To all whom it may concern:*

Be it known that I, FRANK TOWNSEND, a citizen of the United States, residing at New York city, in the State of New York, have invented certain new and useful Improvements in Pipe-Couplings, of which the following is a full, clear, and exact specification.

This invention relates to pipe couplings, and has for its object to provide an efficient coupling without screw threads and which may be disconnected whenever desired.

Heretofore, in separable couplings, it has been customary to thread the end of one of the pipes or members to be connected.

It is the aim of the present invention to dispense with the necessity for cutting a thread on the pipe, and to provide means for effectively securing the smooth end of the pipe without danger of leakage or accidental displacement.

Other objects will appear as the description proceeds.

The invention will be first hereinafter described in connection with the accompanying drawings, which constitute part of this specification, and then more specifically defined in the claims at the end of the description.

In the accompanying drawing, wherein similar reference characters are used to designate corresponding parts throughout the several views: Figure 1 is a side view of a valve equipped with my improved coupling at one side thereof connected to a pipe. Fig. 2 is a central longitudinal section taken on the line II—II of Fig. 1. Fig. 3 is a section on the line III—III of Fig. 1, showing the face of the clamp in elevation, and Fig. 4 is a detailed outer face view of the gasket.

Referring more particularly to the drawings, 1 designates an ordinary valve, one flange 2 of which is bored at 3 for the passage of axially extending bolts 4. A pipe 5, having a smooth, unthreaded end, is secured to the end of the valve 1 having the bored flange 2 by means of the bolts 4, a gasket 6, and a split clamping ring 8.

The gasket 6 may be made of any suitable metal, such as Babbitt metal, or fibrous material, and is provided with a radially extending flange 7 at its inner end, which flange is bored at 70 to register with the bores 3 in the flange 2 of the valve. The two members 8 of the clamping ring fit around the gasket 6 and against the outer face of the flange 7, and are also bored, at 80, in alinement with the bores 70, in the flange 7, and 3, in the flange 2. The bolts 4 are passed through these bores 3, 70 and 80, and by means of the nuts 40 bind the clamping ring 8 to the flange 2 of the valve, the flange 7 of the gasket being compressed between these parts and thus producing a water tight joint.

The two members of the clamping ring are provided with ears 9 which are bored to receive bolts 10 by means of which said ring is clamped about the gasket 6 and pipe 5. It will be understood that by screwing up this clamping ring, the gasket 6 will be compressed around the pipe 5 and complete the water pipe joint. To insure the retention of the pipe 5 within the gasket, a set screw 11 may be arranged radially through the clamping ring and gasket to bind upon said pipe.

It will be understood that the valve is only used by way of illustration as one member or part connected by my improved pipe coupling, and that a pipe or other member provided with a flange corresponding to the flange 2 may be substituted for the valve and connected to the pipe 5 by the coupling in the same manner as hereinbefore described. The pipe 5 may be easily disconnected or released from the coupling by simply loosening the bolts 10 and nuts 40, as will be readily understood.

Having thus described my invention, what I claim as new and desire to secure by Letters Patent of the United States is:

1. The combination, with two hollow parts to be connected, of a flange on one part, a gasket having a flange to engage the first flange, a clamping ring around the gasket for clamping the latter about the end of the other member, and means for clamping said ring to the flange on the first member with the flange of the gasket between them, for the purpose specified.

2. The combination, with two hollow members to be coupled together, of a flange on one member, a gasket to fit around the other member, a clamping ring arranged about the gasket for clamping the same to the second member, and means for fastening the clamping ring to the flange of the first member, the gasket having a flange extending between the clamping ring and flange of the first member, for the purpose specified.

3. The combination, with two hollow members to be coupled together, of a flange on one member, a gasket to fit around the other member, a clamping ring arranged about the gasket for clamping the same to the second member, means for fastening the clamping ring to the flange of the first member, and a set screw passed through the clamping ring and gasket to bind upon the second member for the purpose specified.

4. The combination with two hollow members to be coupled together, of a flange on one member, a gasket to fit around the other member, a clamping ring arranged about the gasket for clamping the same to the second member, means for fastening the clamping ring to the flange of the first member, and a set screw passed through the clamping ring and gasket to bind upon the second member for the purpose specified, the gasket having a flange extending between the clamping ring and the flange on the first member.

In testimony whereof I have signed my name to this specification.

FRANK TOWNSEND.